L. S. BARENGUERAS.
SELF PACKING FLUID PRESSURE DEVICE.
APPLICATION FILED JAN. 21, 1916.
1,233,438.
Patented July 17, 1917.
2 SHEETS—SHEET 1.
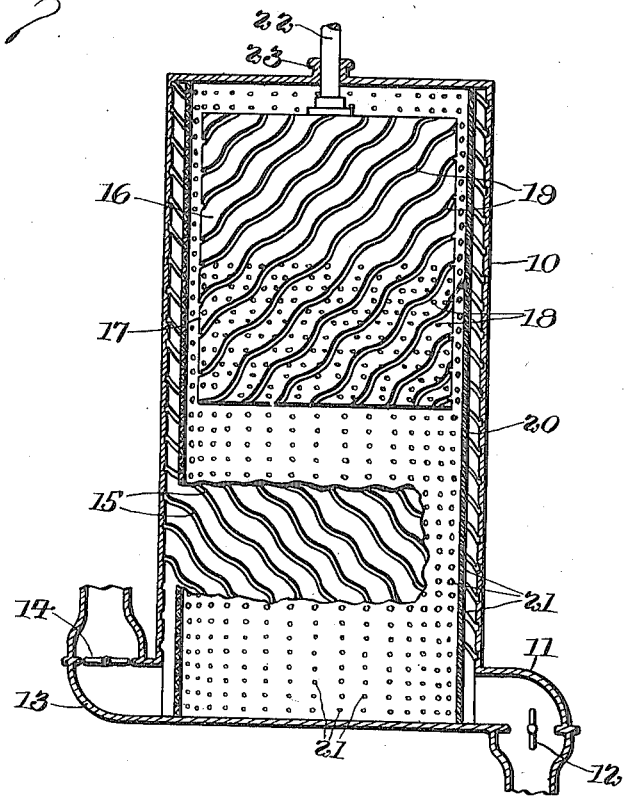
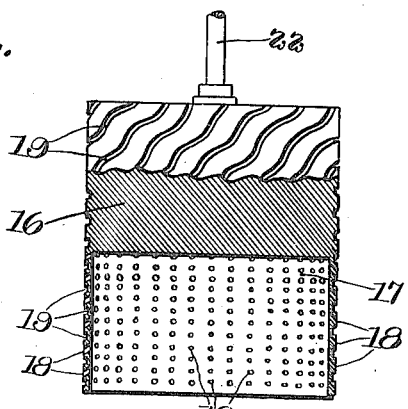

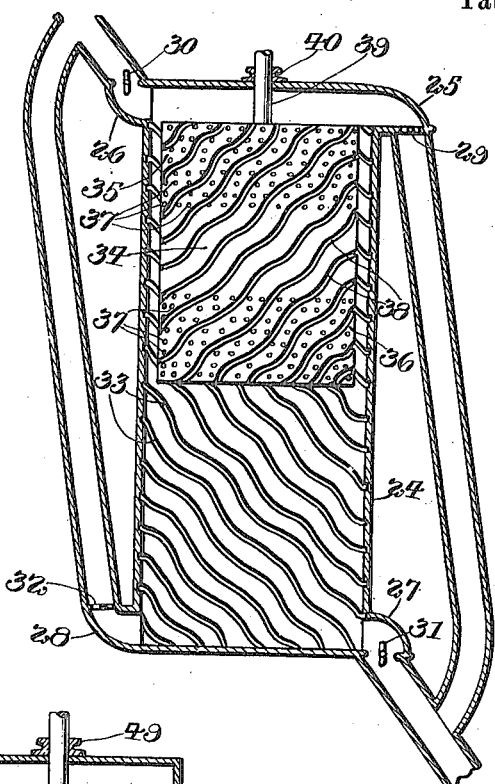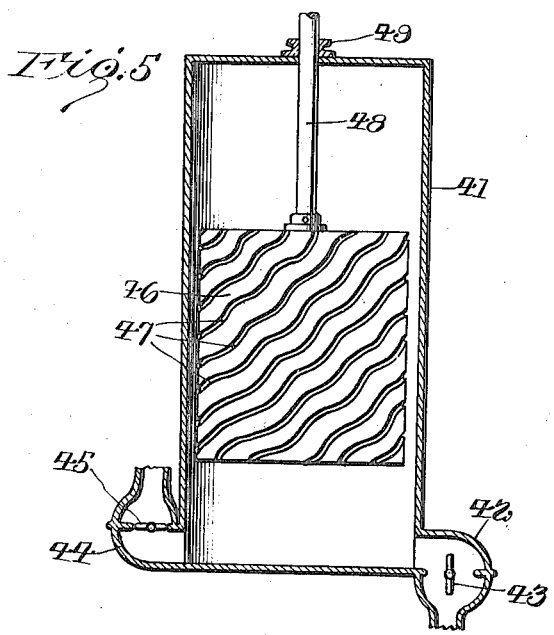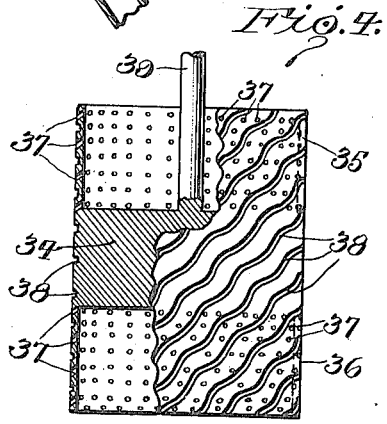

UNITED STATES PATENT OFFICE.

LUIS SALLÉS BARENGUERAS, OF HABANA, CUBA.

SELF-PACKING FLUID-PRESSURE DEVICE.

1,233,438.                    Specification of Letters Patent.          Patented July 17, 1917.

Application filed January 21, 1916. Serial No. 73,440.

*To all whom it may concern:*

Be it known that I, LUIS SALLÉS BARENGUERAS, a subject of the King of Spain, and a resident of the city of Habana, in the Republic of Cuba, have invented certain new and useful Improvements in Self-Packing Fluid-Pressure Devices, of which the following is a specification.

The invention relates to an arrangement of a piston and cylinder or the like of a fluid pressure device, having as its object the elimination of frictional packing between the various parts.

In carrying out the present invention, the piston, the relative length of which is determined by the maximum of pressure to which it is to be subjected, may be solid or wholly or partially tubular. The external cylindrical face of the piston is provided with numerous grooves or flutings of greater or less depth, extending in a longitudinally oblique or generally helical direction, through which the fluid contained in the cylinder is forced by the movement of the piston within the cylinder.

In cases where the pressure produced or encountered by the piston is high the latter is provided with numerous perforations communicating with the hollow interior thereof, extending therefrom in a laterally oblique descending direction to the exterior wall of the piston. As the above mentioned interior of the piston communicates with the interior of the cylinder, fluids compressed therein are directed outwardly through the perforations against the wall of the surrounding casing.

The internal face of the cylinder is spaced slightly from the piston, this spacing preventing frictional contact between the two elements of the device. It may, furthermore, be provided with grooves or flutings of greater or less depth, running in a longitudinally oblique or generally helical direction, their direction being opposed to that of the grooves formed on the piston.

In certain cases a cylindrical element may be interposed between the piston and cylindrical casing, its walls being provided with numerous perforations substantially like those as provided in the piston.

In the accompanying drawings:

Figure 1 is a sectional view of a pump embodying the present invention, shown in part conventionally and partially broken away.

Fig. 2 is a view of the piston of Fig. 1.

Fig. 3 is a sectional view of a modified form of a pump embodying the invention, shown partially broken away.

Fig. 4 is a view of the piston of Fig. 3.

Fig. 5 is a further modified form of a pump.

In Figs. 1 and 2, 10 is a cylindrical casing provided with inlet 11, inlet valve 12, outlet 13 and outlet valve 14. The casing is provided interiorly with numerous inclined irregular or wavy grooves or flutings 15. 16 is the piston, the upper portion of which is solid and the lower portion 17 of which is a cylindrical shell provided with perforations 18 extending radially in an oblique direction downwardly. The entire outer surface of the piston is provided with irregular or wavy flutings or grooves 19 running in an oblique or helical direction opposite to that of the grooves on the interior wall of the casing. Between the casing 10 and the piston 16 a cylindrical sleeve 20 is provided, being attached to the casing 10 at the upper end only or at both ends. The sleeve 20 is provided over its entire surface with numerous perforations 21, these being radial and directed obliquely downward. The piston 16 is operated by piston rod 22, which passes through opening 23 in casing 10.

In each of the figures of the drawings the spaces between the various elements are greatly exaggerated, the actual spaces existing being only sufficient to permit of their relative movement without frictional contact.

In the operation of the devices of Figs. 1 and 2 on the compression stroke the liquid under compression, in rising around the piston, is forced to move in eddying currents in one direction by the grooving on the piston and in ascending currents in the opposite direction by the grooving on the interior wall of the casing. At the same time the compressed fluid is forced through perforations in the lower portion of the piston and in the cylindrical sleeve in numerous fine jets, the numerous opposing currents and jets of the compressed fluid meeting and forming vortical rings surrounding the piston. These constantly forming rings effect a packing of the compressed fluid surrounding the piston when the latter is moved and eliminate frictional contact between the elements.

Figs. 3 and 4 present a pump having a casing 24 provided with an inlet 25 and an outlet 26 at the upper end and an inlet 27 and an outlet 28 at the lower end. Inlet valves 29 and 31 are provided for the upper and lower inlets respectively and valves 30 and 32 for the upper and lower outlets. The interior of the casing 24 is provided with irregular or wavy helical grooves or flutings 33. Piston 34 is composed of a central solid portion and an upper hollow portion 35 and a lower hollow portion 36, each hollow portion being provided with perforations 37 like those of the piston of the device of Figs. 1 and 2. The external wall of the piston is also provided with irregular helical grooves 38 running in a direction opposite that of the grooves 33 of casing 24. The piston is operated by means of piston rod 39 which passes through opening 40 in the casing 24.

In the operation of the device of Figs. 3 and 4 each stroke is a compression stroke and causes a vortical movement of the compressed fluid between the piston and casing, thereby producing a fluid packing as in the above described case.

Fig. 5 shows a pump having a casing 41 provided with inlet 42 having inlet valve 43 and outlet 44 having outlet valve 45. Piston 46 is provided with helical irregular grooves 47 and is controlled by piston rod 48 which passes through opening 49 in the casing 41. The grooves in the piston produce a current of the compressed fluid between it and the internal wall of the cylindrical casing when the piston is moved, thereby producing a packing effect.

In the above devices the arrangement of grooves or of grooves and perforations on the opposing walls of the piston and casings produces a large number of opposing and reacting jets and currents of the compressed fluid, thereby producing vortical eddies of the fluid which produce the effect of a packing surrounding the piston and eliminating the necessity of a frictional contact or packing.

In the case of low pressures a sufficient packing effect may be produced by properly proportioning the length of the piston relative to its diameter.

Although the specific form of invention shown is primarily for liquids, it is evident that it may be applied also to other devices depending on the action of a compressed fluid, as, for example, steam engines, compressed air motors, or the like, or hand or motor operated sprays, syringes, or the like.

I claim:

1. In a fluid compression device the combination of a cylindrical casing, a piston movable in the casing and without friction or contact therewith, the wall of the piston being provided with a plurality of waved grooves, whereby a packing is effected between the piston and the casing on compression of the fluid on one face of the piston by the production of counter currents in the fluid.

2. In a fluid compression device the combination of a cylindrical casing, a piston movable in the casing and without frictional contact therewith, the walls of the piston and casing being provided with opposed waved helical grooves, whereby a packing is effected between the piston and the casing on compression of the fluid on one face of the piston by the production of counter currents in the fluid.

3. In a fluid compression device the combination of a cylindrical casing, a piston movable therein and without frictional contact therewith, the wall of the piston being provided with helical grooves and a section thereof communicating with the interior of the casing being hollow and provided with numerous perforations extending outwardly whereby a packing is effected between the piston and the casing on compression of the fluid on one face of the piston.

4. In a fluid compression device the combination of a cylindrical casing, a piston movable therein and without frictional contact therewith, the walls of the piston and casing being provided with opposed helical grooves and a section of said piston communicating with the interior of the casing being hollow and provided with numerous perforations extending outwardly whereby a packing is effected between the piston and the casing on compression of the fluid on one face of the piston.

5. In a pump, a casing, a piston therein, the walls of said casing and piston having opposed helical grooves, the lower portion of said piston being hollow and provided with numerous perforations, and a perforated cylindrical sleeve being interposed between the piston and the casing whereby a packing is effected between the piston and the casing on compression of the fluid on one face of the piston.

6. In a pump the combination comprising a casing, a piston disposed in the casing and a sleeve disposed between the casing and the piston and provided with a plurality of openings.

7. In a pump, the combination comprising a casing, a piston disposed in the casing and a sleeve disposed between the casing and the piston and provided with a plurality of downwardly projecting openings.

LUIS SALLÉS BARENGUERAS.